A. H. MARRET, OF WATER WORKS, KENTUCKY.

*Letters Patent No. 82,731, dated October 6, 1868.*

IMPROVEMENT IN THE MANUFACTURE OF ARTIFICIAL STONE.

The Schedule referred to in these Letters Patent and making part of the same.

*To all whom it may concern:*

Be it known that I, A. H. MARRET, of Louisville, in the county of Jefferson, and State of Kentucky, have invented a new and improved Process for Making Artificial Stones for building, paving, and other purposes, &c.; and I do hereby declare the following to be a full, clear, and exact description thereof.

The nature of my invention consists in forming a porous block of hydraulic cement and sand, and in saturating said block with silicate of soda or potash, which fills up the pores, and renders the block more compact, and gives it a smooth surface, capable of taking a polish.

To enable others skilled in the art to make use of my invention, I will proceed to describe my process.

I take one part of sharp sand and mix with two parts of hydraulic cement, adding sufficient water to form a pasty mass. This composition is put into moulds of the proper shape, and allowed to dry in the shade. The blocks, thus formed, are then removed from the moulds, and are placed in water, where they are allowed to remain for twenty-four hours. They are then removed and saturated with a solution of silicate of soda or potash. The silicate solution may be applied with a brush, or the blocks may be saturated by dipping directly into said solution. Any desirable coloring-matter may be mixed with the composition before being moulded.

What I claim as my invention, and desire to secure by Letters Patent, is—

The process of manufacturing block, substantially, for all building-purposes, as herein described.

A. H. MARRET.

Witnesses:
JOHN KAYE,
EMIL SCHEFFER.